United States Patent
Mielenz et al.

(10) Patent No.: US 11,435,191 B2
(45) Date of Patent: Sep. 6, 2022

(54) METHOD AND DEVICE FOR DETERMINING A HIGHLY PRECISE POSITION AND FOR OPERATING AN AUTOMATED VEHICLE

(71) Applicant: Robert Bosch GmbH, Stuttgart (DE)

(72) Inventors: Holger Mielenz, Ostfildern (DE); Daniel Zaum, Sarstedt (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 70 days.

(21) Appl. No.: 16/646,238

(22) PCT Filed: Sep. 11, 2018

(86) PCT No.: PCT/EP2018/074459
§ 371 (c)(1),
(2) Date: Mar. 11, 2020

(87) PCT Pub. No.: WO2019/057553
PCT Pub. Date: Mar. 28, 2019

(65) Prior Publication Data
US 2020/0271455 A1 Aug. 27, 2020

(30) Foreign Application Priority Data
Sep. 25, 2017 (DE) ...................... 10 2017 216 954.0

(51) Int. Cl.
*G01C 21/30* (2006.01)
*B60W 60/00* (2020.01)
*G05D 1/02* (2020.01)

(52) U.S. Cl.
CPC ......... *G01C 21/30* (2013.01); *B60W 60/0025* (2020.02); *G05D 1/0274* (2013.01); *G05D 2201/0213* (2013.01)

(58) Field of Classification Search
CPC . G01C 21/30; B60W 60/0025; G05D 1/0274; G05D 2201/0213
See application file for complete search history.

(56) References Cited

U.S. PATENT DOCUMENTS 9,689,682 B1   6/2017 Laine et al.
2010/0235096 A1 9/2010 Miyagi
(Continued)

FOREIGN PATENT DOCUMENTS

DE   102014002150 B3   7/2015
JP      2007098800 A    4/2007
(Continued)

OTHER PUBLICATIONS

International Search Report for PCT/EP2018/074459, dated Dec. 13, 2018.

*Primary Examiner* — James J Lee
*Assistant Examiner* — Steven Vu Nguyen
(74) *Attorney, Agent, or Firm* — Norton Rose Fulbright US LLP; Gerard Messina

(57) ABSTRACT

A method and a device for determining a highly precise position and for operating an automated vehicle, including: detecting surroundings data values, the surroundings data values representing surroundings of the automated vehicle, the surroundings encompassing at least two surroundings features, determining a pattern, as a function of the at least two surroundings features, reading in map data values, the map data values representing a map, the map representing at least the surroundings of the automated vehicle, the map encompassing a reference pattern, determining the highly precise position of the automated vehicle, proceeding from a comparison of the pattern to the reference pattern, and operating the automated vehicle, as a function of the highly precise position.

4 Claims, 3 Drawing Sheets

(56) References Cited

U.S. PATENT DOCUMENTS

| | | |
|---|---|---|
| 2012/0310516 A1 | 12/2012 | Zeng |
| 2016/0097644 A1* | 4/2016 | Strassenburg-Kleciak ................. G06T 7/70 701/461 |
| 2017/0307746 A1* | 10/2017 | Rohani .................. G01S 13/42 |
| 2018/0202814 A1* | 7/2018 | Kudrynski ......... G01C 21/3807 |

FOREIGN PATENT DOCUMENTS

| | | |
|---|---|---|
| JP | 2012014262 A | 1/2012 |
| JP | 2015222223 A | 12/2015 |
| WO | 2014166532 A1 | 10/2014 |
| WO | 2017141414 A1 | 8/2017 |

* cited by examiner

METHOD AND DEVICE FOR DETERMINING A HIGHLY PRECISE POSITION AND FOR OPERATING AN AUTOMATED VEHICLE

FIELD OF THE INVENTION

The present invention relates to a method and to a device for determining a highly precise position and for operating an automated vehicle, including a step of detecting surroundings data values, the surroundings data values representing surroundings of the automated vehicle, the surroundings encompassing at least two surroundings features, a step of determining a pattern, as a function of the at least two surroundings features, a step of reading in map data values, the map data values representing a map, the map representing at least the surroundings of the automated vehicle, the map encompassing a reference pattern, a step of determining the highly precise position of the automated vehicle, proceeding from a comparison of the pattern to the reference pattern, and a step of operating the automated vehicle, as a function of the highly precise position.

SUMMARY OF THE INVENTION

The method according to the present invention for determining a highly precise position and for operating an automated vehicle includes a step of detecting surroundings data values, the surroundings data values representing surroundings of the automated vehicle, the surroundings encompassing at least two surroundings features, and a step of determining a pattern, as a function of the at least two surroundings features. The method furthermore includes a step of reading in map data values, the map data values representing a map, the map representing at least the surroundings of the automated vehicle, the map encompassing a reference pattern, a step of determining the highly precise position of the automated vehicle, proceeding from a comparison of the pattern to the reference pattern, and a step of operating the automated vehicle, as a function of the highly precise position.

An automated vehicle shall be understood to mean a semi, highly or fully automated vehicle.

An operation of the automated vehicle shall be understood to mean that the automated vehicle is operated in a semi, highly or fully automated manner. The operation encompasses, for example, determining a trajectory for the automated vehicle and/or following the trajectory with the aid of an automated transverse and/or longitudinal control and/or carrying out safety-relevant driving functions, etc.

A highly precise position shall be understood to be a position which is so precise within a predefined coordinate system, for example GNSS coordinates, that this position does not exceed a maximum permissible lack of definition. The maximum lack of definition may, for example, depend on the surroundings of the automated vehicle. Furthermore, the maximum lack of definition may, for example, depend on whether the automated vehicle is operated in a semi, highly or fully automated manner. In principle, the maximum lack of definition is so low that a safe operation of the automated vehicle is ensured. For a fully automated operation of the automated vehicle, the maximum lack of definition is in a range of approximately 10 centimeters, for example.

A map shall, for example, be understood to mean a digital map, which is configured, for example in conjunction with a navigation system and/or a control unit of the automated vehicle and/or in conjunction with a smart phone, which is connected to or encompassed by the automated vehicle, to determine a highly precise position of the automated vehicle and/or to carry out a function, as a function of the highly precise position, etc. In one specific embodiment, a map shall be understood to mean data values representing reference patterns in conjunction with their positions.

Surroundings of the automated vehicle shall, for example, be understood to mean an area which may be detected with the aid of a surroundings sensor system of the automated vehicle.

A surroundings sensor system shall be understood to mean, for example, at least one video sensor and/or at least one radar sensor and/or at least one LIDAR sensor and/or at least one ultrasonic sensor and/or at least one further sensor, which is configured to detect the surroundings of the automated vehicle in the form of surroundings data values.

The method according to the present invention advantageously solves the problem that a safe and reliable operation of an automated vehicle in many instances depends on having knowledge of a highly precise position of the automated vehicle. The method described here supports the determination of the highly precise position, in particular, with the aid of patterns which may be detected easily and quickly and determined based on the surroundings data values.

The at least two surroundings features may be configured as light sources. The pattern is determined by determining a color gradient and/or a brightness profile of the at least two surroundings features.

A light source shall, for example, be understood to mean a street lamp and/or an illuminated advertising and/or a traffic light system and/or a window of an illuminated room of a building, in particular, a shop window, and/or further light sources.

A pattern shall, for example, be understood to mean a characteristic color gradient and/or brightness profile, which arises, for example, in that the surroundings data values are depicted in the form of an image with the aid of a surroundings sensor system of the automated vehicle and/or evaluated with the aid of suitable software.

A reference pattern shall, for example, be understood to mean a pattern which is detected in advance and stored in a map in conjunction with a position information.

This yields the advantage that, even in urban areas which have a high density of light sources, a highly precise position may be determined with the aid of surroundings features present anyhow by including the present light sources. Since, on the one hand, many of the light sources (street lamps, illuminated advertising, etc.) are often attached at a height which is greater than the average height of a vehicle, and, on the other hand, the light sources may be detected at any time of day; it is ensured, even with a high traffic volume and/or in the case of dark surroundings, that the light sources may be detected with the aid of the surroundings sensor system. This makes the method particularly robust, and increases the safety during the operation of the automated vehicle.

The map may encompass the reference pattern, as a function of a time of day and/or as a function of a time of year and/or as a function of a weather condition.

Since many surroundings features, in particular, light sources, have different color gradients and/or brightness profiles at different times of day (for example, based on day and night, with respect to the ambient brightness) and/or different times of year (for example, based on different positions of the sun and/or different times when it gets light or dark) and/or different weather conditions (fog, sunshine, rain, snowfall, etc.) during a detection with the aid of a surroundings sensor system, these differences are advantageously taken into consideration. This makes the method robust with respect to different external conditions and thus enhances the safety during the operation of the automated vehicle.

The map data values may be read in by receiving the map data values from an external server.

An external server shall be understood to mean a map provider, for example. This advantageously makes it possible for the map, in particular, with respect to the time of day and/or the time of year and/or the weather condition, and/or with respect to structural changes, for example, which result in changes of a pattern or reference pattern, to be created up-to-the-minute and thus be provided to the automated vehicle.

The device according to the present invention for determining a highly precise position and for operating an automated vehicle includes first apparatus/device for detecting surroundings data values, the surroundings data values representing surroundings of the automated vehicle, the surroundings encompassing at least two surroundings features, and second apparatus/device for determining a pattern, as a function the at least two surroundings features. The device furthermore includes third apparatus/device for reading in map data values, the map data values representing a map, the map representing at least the surroundings of the automated vehicle, the map encompassing a reference pattern, fourth apparatus/device for determining the highly precise position of the automated vehicle, proceeding from a comparison of the pattern to the reference pattern, and fifth apparatus/device for operating the automated vehicle, as a function of the highly precise position.

The first apparatus/device and/or the second apparatus/device and/or the third apparatus/device and/or the fourth apparatus/device and/or the fifth apparatus/device may be configured to carry out a method as described herein.

Advantageous refinements of the present invention are stated in the further descriptions herein and described in the description.

Exemplary embodiments of the present invention are shown in the drawings and are described in greater detail in the following descriptions.

DETAILED DESCRIPTION

Figure 1:
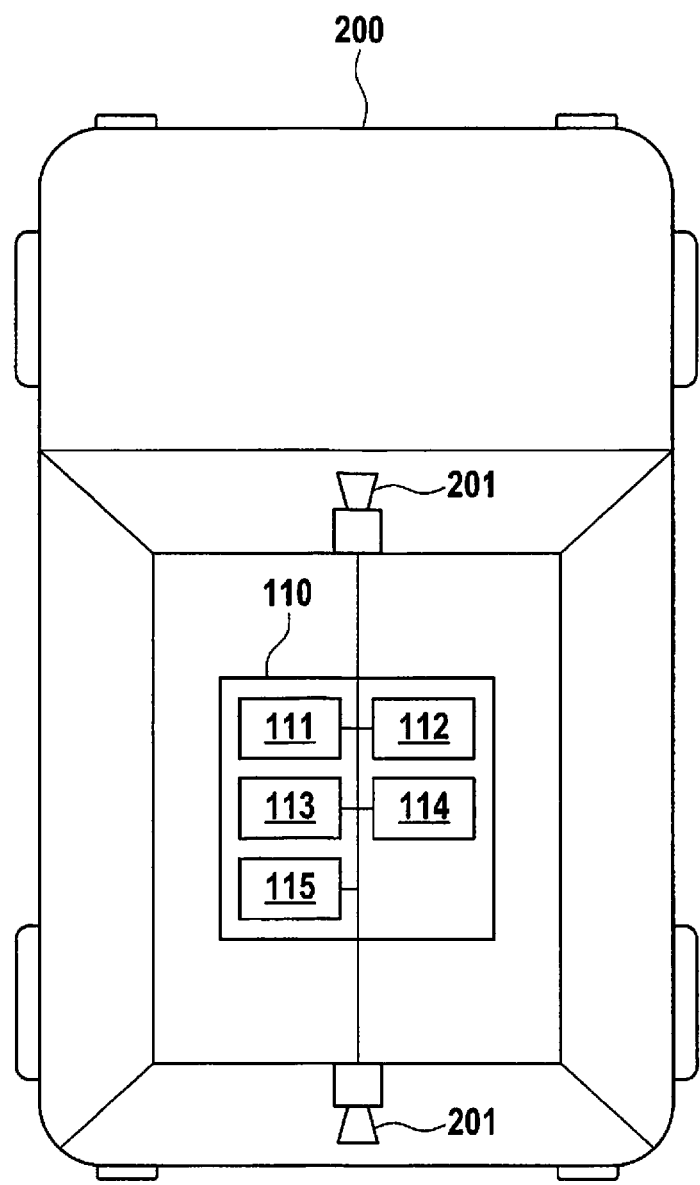
FIG. 1 shows one exemplary embodiment of the device according to the present invention.

FIG. 1 shows an automated vehicle 200, which includes device 110 according to the present invention for determining 340 a highly precise position 210 and for operating 350 an automated vehicle 200.

Device 110 includes a first apparatus/device (arrangement) 111 for detecting 310 surroundings data values, the surroundings data values representing surroundings 220 of automated vehicle 200, surroundings 220 encompassing at least two surroundings features 221, 222, and a second apparatus/device (arrangement) 112 for determining 320 a pattern, as a function of the at least two surroundings features 221, 222. The device furthermore includes a third apparatus/device (arrangement) 113 for reading in 330 map data values, the map data values representing a map, the map representing at least surroundings 220 of automated vehicle 200, the map encompassing a reference pattern, a fourth apparatus/device (arrangement) 114 for determining 340 highly precise position 210 of automated vehicle 200, proceeding from a comparison of the pattern to the reference pattern, and a fifth apparatus/device (arrangement) 115 for operating 350 automated vehicle 200, as a function of highly precise position 210.

First apparatus/device 111 for detecting 310 surroundings data values are configured, for example, as a surroundings detection system in such a way that they encompass a dedicated surroundings sensor system or are connected to a surroundings sensor system 201 already encompassed by automated vehicle 200.

The first apparatus/device furthermore include a processing unit (processor, working memory, hard drive, software), for example, which processes and evaluates the surroundings data values—for example with the aid of methods of object classification, etc. First apparatus/device 111 are furthermore configured to forward the surroundings data values to second apparatus/device 112. In one specific embodiment, first apparatus/device 111 are configured to forward the surroundings data values without evaluation and/or with a change of the data format to second apparatus/device 112.

Second apparatus/device 112 for determining 320 a pattern, as a function of the at least two surroundings features 221, 222, are configured as a processing unit (processor, working memory, hard drive, software), for example. The software is configured to determine patterns in the surroundings data values which are transmitted, for example, from first apparatus/device 111 in the form of a digital image—in particular, with the aid of a color gradient and/or a brightness profile of the at least two surroundings features 221, 222. For example, a pattern is determined by determining geometric objects (circles, straight lines, star-shaped objects, arrangement of points, etc.). In one specific embodiment, the patterns are determined as a function of surroundings sensor system 201 of automated vehicle 200 since, for example, the same at least two surroundings features 221, 222 generate different patterns as a function of the different sensor system. Second apparatus/device 112 are furthermore configured to forward the pattern to fourth apparatus/device 114.

Third apparatus/device 113 for reading in 330 map data values are configured as a data interface, for example, which includes a storage medium for storing the map data values and an interface for transmitting the map data values to fourth apparatus/device 114. In one further specific embodiment, third apparatus/device 113 are configured to read in the map data values and transmit them to fourth apparatus/device 114 by receiving the map data values from an external server 230. For this purpose, third apparatus/device 113 are configured as a transceiver unit, for example. In one further specific embodiment, third apparatus/device 113 are configured in such a way that they are connected to a transceiver unit already encompassed by the vehicle—in particular, a smart phone. Third apparatus/device 113 are furthermore configured to forward the map data values to fourth apparatus/device 114.

Fourth apparatus/device 114 for determining 340 highly precise position 210, proceeding from a comparison of the pattern to the reference pattern, are configured as a control unit and/or a processing unit, for example, which include, for example, a processor, a working memory and a hard disk and suitable software for determining 340 a highly precise position 210 of automated vehicle 200.

Fifth apparatus/device 115 for operating 350 automated vehicle 200, as a function of highly precise position 210, are configured as a control unit, for example.

Figure 2:
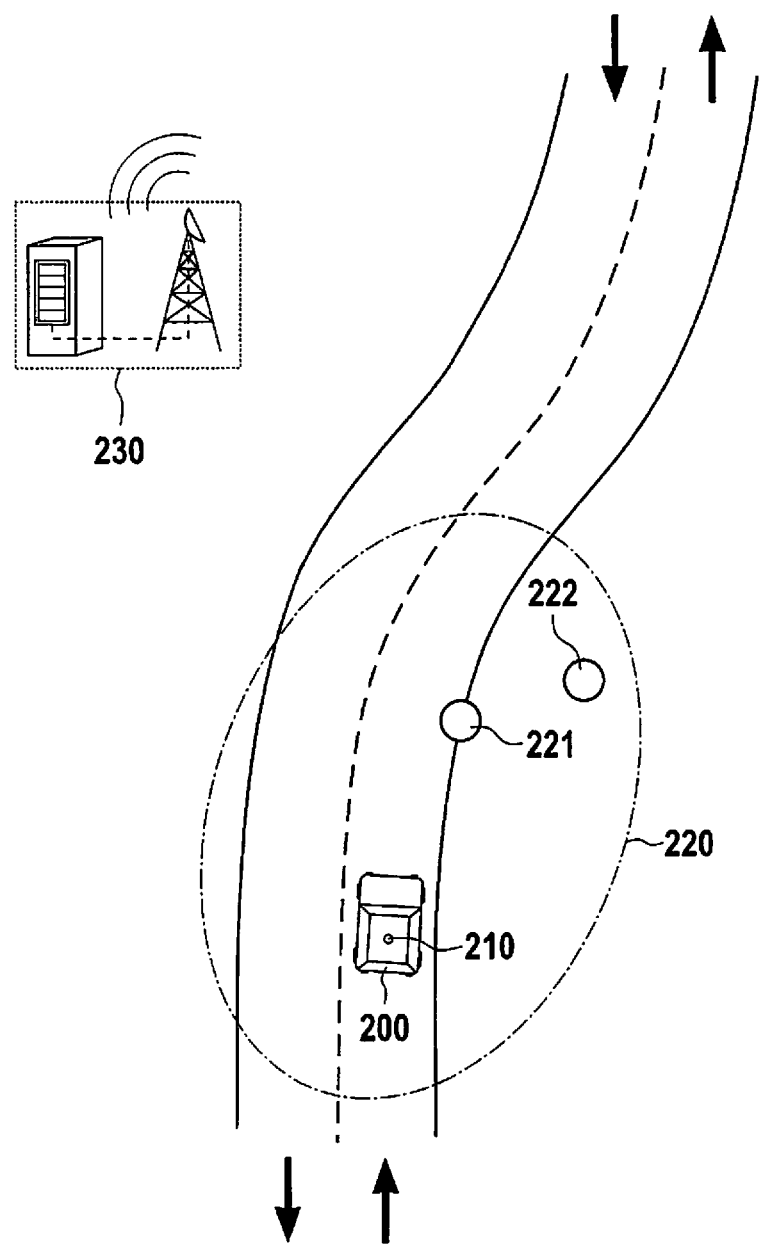
FIG. 2 shows one exemplary embodiment of the method according to the present invention.

FIG. 2 shows one exemplary embodiment of method 300 for determining 340 a highly precise position 210 and for operating 350 an automated vehicle 200.

Automated vehicle 200 is situated on a two-lane road having one traffic lane for each driving direction. Surroundings data values are detected with the aid of device 110 for determining 340 highly precise position 210 and for operating 350 automated vehicle 200, the surroundings data values representing surroundings 220 of automated vehicle 200, surroundings 220 encompassing at least two surroundings features 221, 222. A pattern is determined as a function of at least two surroundings features 221, 222, which are configured as light sources, for example. The pattern is determined, for example, by determining a color gradient and/or a brightness profile of the at least two surroundings features 221, 222. Moreover, map data values are read in, for example from a storage medium and/or by receiving the map data values from an external server 230. The map data values represent a map in the process, the map representing at least surroundings 220 of automated vehicle 200, the map encompassing a reference pattern. Thereafter, highly precise position 210 of automated vehicle 200 is determined proceeding from a comparison of the pattern to the reference pattern.

Highly precise position 210 is determined, for example, by comparing certain variables (lengths, angles, radii, etc.) which the pattern has to comparable variables of the reference pattern. For example, based on a variable and/or an orientation of the pattern compared to the reference pattern, a distance and/or an orientation of automated vehicle 200, for example proceeding from at least one position of the at least two surroundings features 221, 222, may be determined and thus, ultimately, highly precise position 210 may be determined, with the aid of vector addition.

Subsequently, automated vehicle 200 is operated as a function of highly precise position 210.

Figure 3:
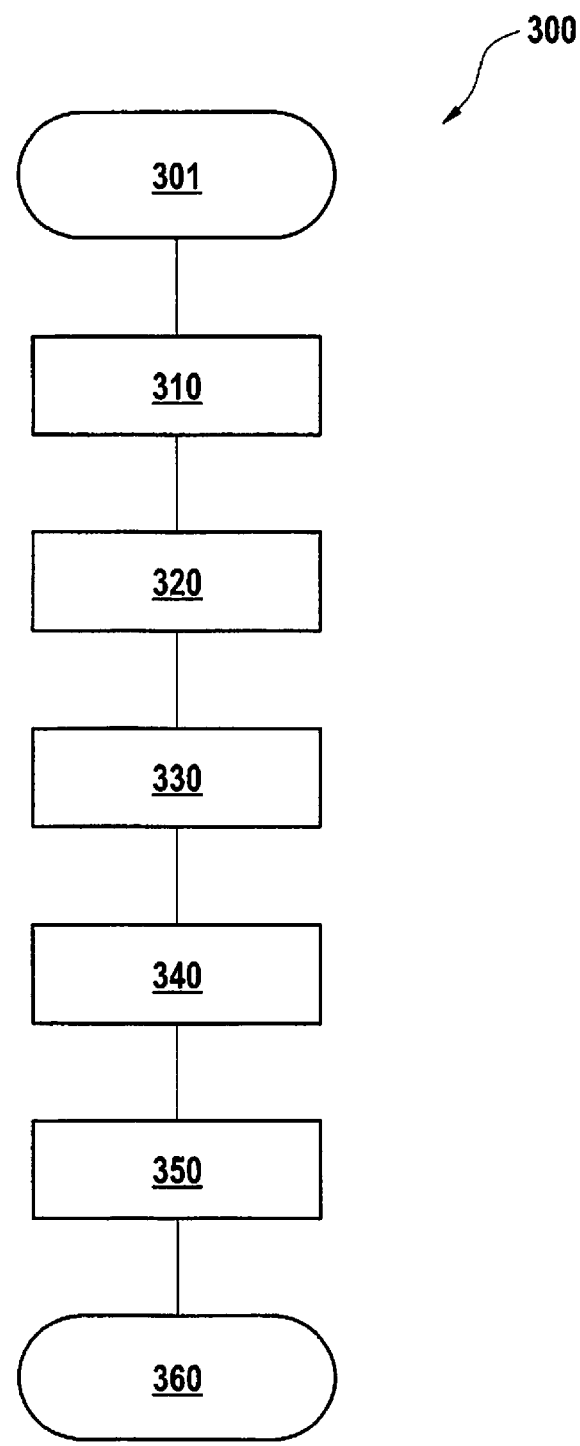
FIG. 3 shows one exemplary embodiment of the method according to the present invention in the form of a flow chart.

FIG. 3 shows one exemplary embodiment of a method 300 according to the present invention for determining 340 a highly precise position 210 and for operating 350 an automated vehicle 200.

In step 301, method 300 starts.

In step 310, surroundings data values are detected, the surroundings data values representing surroundings 220 of automated vehicle 200, surroundings 220 encompassing at least two surroundings features 221, 222.

In step 320, a pattern is determined, as a function of the at least two surroundings features 221, 222.

In step 330, map data values are read in, the map data values representing a map, the map representing at least surroundings 220 of automated vehicle 200, the map encompassing a reference pattern.

In one further specific embodiment, step 330 is carried out first, and subsequently step 310 and step 320 are carried out, before subsequent step 340 follows.

In step 340, highly precise position 210 of automated vehicle 200 is determined, proceeding from a comparison of the pattern to the reference pattern.

In step 350, automated vehicle 200 is operated as a function of highly precise position 210.

In step 360, method 300 ends.

What is claimed is:

1. A method for determining a highly precise position and for operating an automated vehicle, the method comprising:

detecting surroundings data values, wherein the surroundings data values represent surroundings of the automated vehicle, and wherein the surroundings encompass at least two surroundings features, which are configured as light sources;

determining a pattern, as a function of the at least two surroundings features, which include the light sources, by determining a color gradient and a brightness profile of the at least two surroundings features;

reading in map data values, wherein the map data values represent a map, the map represents at least the surroundings of the automated vehicle, and the map encompasses a reference pattern;

determining the highly precise position of the automated vehicle by comparing the pattern to the reference pattern by comparing variables of lengths, angles, and radii which the pattern has to corresponding variables of the reference pattern; and operating the automated vehicle, as a function of the highly precise position;

wherein the highly precise position is determined based on the variables and an orientation of the pattern compared to the reference pattern, a distance and an orientation of the automated vehicle proceeding from at least one position of the at least two surroundings features, and wherein the reference pattern includes a pattern which is detected in advance and stored in the map in conjunction with position information, and wherein the map data values are read in by receiving the map data values from an external server.

2. The method of claim 1, wherein the map encompasses the reference pattern, as a function of a time of day and/or as a function of a time of year, and as a function of a weather condition.

3. A device for determining a highly precise position and for operating an automated vehicle, comprising:

a first means for detecting surroundings data values, wherein the surroundings data values represent surroundings of the automated vehicle, and wherein the surroundings encompass at least two surroundings features, which are configured as light sources;

a second means for determining a pattern, as a function of the at least two surroundings features, which include the light sources, by determining a color gradient and a brightness profile of the at least two surroundings features;

a third means for reading in map data values, wherein the map data values represent a map, the map represent at least the surroundings of the automated vehicle, and the map encompasses a reference pattern;

a fourth means for determining the highly precise position of the automated vehicle, by comparing the pattern to the reference pattern by comparing variables of lengths, angles, and radii which the pattern has to corresponding variables of the reference pattern; and a fifth means for operating the automated vehicle, as a function of the highly precise position;

wherein the highly precise position is determined based on the variables and an orientation of the pattern compared to the reference pattern, a distance and an orientation of the automated vehicle proceeding from at least one position of the at least two surroundings features, and wherein the reference pattern includes a pattern which is detected in advance and stored in the map in conjunction with position information, and wherein the map data values are read in by receiving the map data values from an external server.

4. The device of claim 3, wherein the following are performed:
- detecting, via the first means, the surroundings data values, wherein the surroundings data values represent the surroundings of the automated vehicle, and wherein the surroundings encompass at least two surroundings features, which are configured as light sources;
- determining, via the second means, the pattern, as the function of the at least two surroundings features, which include the light sources, by determining a color gradient and a brightness profile of the at least two surroundings features;
- reading in, via the third means, the map data values, wherein the map data values represent the map, the map represents at least the surroundings of the automated vehicle, and the map encompasses the reference pattern;
- determining, via the fourth means, the highly precise position of the automated vehicle, by the comparing of the pattern to the reference pattern by comparing the variables of the lengths, the angles, and the radii which the pattern has to the corresponding variables of the reference pattern; and
- operating, via the fifth means, the automated vehicle, as the function of the highly precise position;

wherein the highly precise position is determined based on the variables and the orientation of the pattern compared to the reference pattern, the distance and the orientation of the automated vehicle proceeding from at least one position of the at least two surroundings features, and wherein the reference pattern includes a pattern which is detected in advance and stored in the map in conjunction with position information, and wherein the map data values are read in by receiving the map data values from an external server.

* * * * *